United States Patent
Uchida et al.

(10) Patent No.: US 7,257,389 B2
(45) Date of Patent: Aug. 14, 2007

(54) WIRELESS COMMUNICATION DEVICE ADJUSTING ANTENNA POSITION AND WIRELESS COMMUNICATION METHOD OF ADJUSTING ANTENNA POSITION

(75) Inventors: Hiroyasu Uchida, Machida (JP); Takanobu Ishibashi, Yokohama (JP); Mitsuaki Satsukawa, Yokohama (JP); Makoto Kamoi, Toda (JP); Kazuaki Naruse, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 10/923,713

(22) Filed: Aug. 24, 2004

(65) Prior Publication Data

US 2005/0048949 A1    Mar. 3, 2005

(30) Foreign Application Priority Data

Aug. 25, 2003    (JP)    ............................. 2003-300348

(51) Int. Cl.
*H04B 5/00*    (2006.01)

(52) U.S. Cl. .................. 455/407; 455/562.1; 455/41.1

(58) Field of Classification Search ............. 455/562.1, 455/407, 41.1; 235/488, 487
See application file for complete search history.

(56) References Cited

U.S. PATENT DOCUMENTS 5,473,323 A * 12/1995 Kreft ....................... 340/10.34
6,173,897 B1    1/2001 Halpern
6,427,065 B1 * 7/2002 Suga et al. ................. 455/41.1
6,842,606 B1 * 1/2005 Takemura ................... 455/41.1
7,017,821 B2 * 3/2006 Kux et al. ................... 235/487

FOREIGN PATENT DOCUMENTS

| EP | 1096414 A2 | 5/2001 |
|---|---|---|
| EP | 1096414 A3 | 5/2001 |
| JP | 9-179954 | 7/1997 |
| JP | 10240879 A | 9/1998 |
| JP | 2002-56361 A | 2/2002 |
| JP | 2003-141464 A | 5/2003 |

OTHER PUBLICATIONS

Danish Search Report dated Apr. 20, 2005 for Appln. No. SG200404581-1.
European Search Report dated Jan. 3, 2005 for Application No. 04 01 9283.
Klaus Finkenzeller: "RFID Handbuch" Carl Hanser Verlag, Muchen Wien, XP002308877, p. 37, lines 7-11, (1998), no month listed.

* cited by examiner

*Primary Examiner*—Lester G. Kincaid
*Assistant Examiner*—Charles Shedrick
(74) *Attorney, Agent, or Firm*—Pillsbury Winthrop Shaw Pittman, LLP

(57) ABSTRACT

A wireless communication device according to an aspect of this invention includes a main body antenna to communicate with the antenna of a wireless card, and an antenna position setting unit capable of setting a plurality of types of positional relationships between the antenna of the wireless card and the main body antenna.

8 Claims, 6 Drawing Sheets

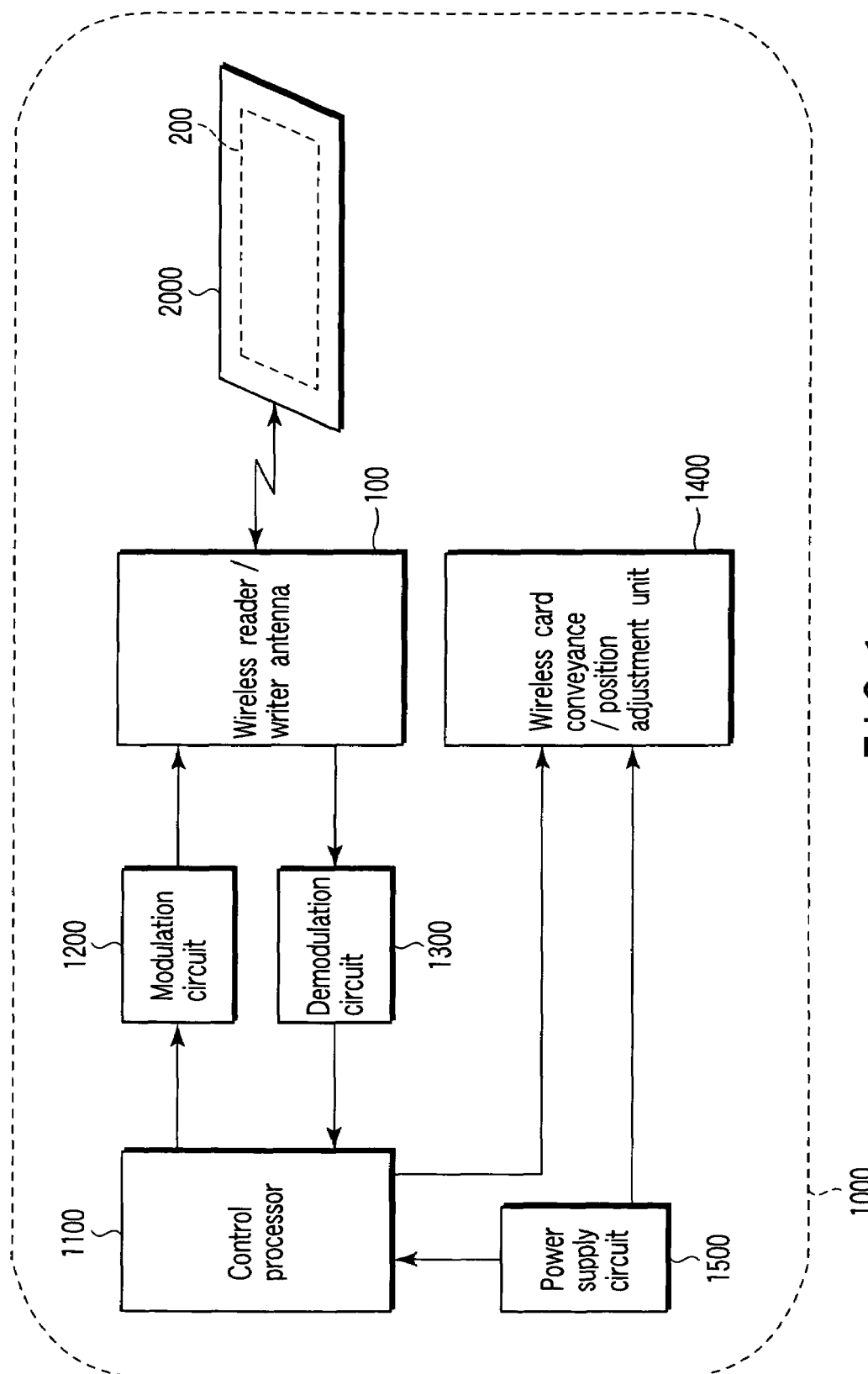
F I G. 1

(Case 1)

(Case 2)

(Case 3)

WIRELESS COMMUNICATION DEVICE ADJUSTING ANTENNA POSITION AND WIRELESS COMMUNICATION METHOD OF ADJUSTING ANTENNA POSITION

CROSS-REFERENCE TO RELATED APPLICATIONS

This application is based upon and claims the benefit of priority from prior Japanese Patent Application No. 2003-300348, filed Aug. 25, 2003, the entire contents of which are incorporated herein by reference.

BACKGROUND OF THE INVENTION

1. Field of the Invention

The present invention relates to a wireless communication device which communicates with a wireless card or wireless tag used for a credit card, reward card, or individual identification medium (e.g., a bankbook, employee card, or passport), and a wireless communication method applied to the wireless communication device.

2. Description of the Related Art

Recently, wireless cards have widely spread for reasons of information security and portability. Organizations such as ISO standardize the communication method so that wireless readers/writers and wireless cards available from various manufacturers can be utilized without any problem. For example, Jpn. Pat. Appln. KOKAI Publication No. 9-179954 discloses a technique for a wireless information processing apparatus which reads/writes data from/on a portable wireless card via a wireless communication medium.

However, when the transmission/reception antenna of the wireless reader/writer and the antenna of the wireless card are in tight contact with each other and have a similar shape, cross coupling between the antennas becomes strong, and their antenna characteristics influence each other. The antenna characteristic of the wireless reader/writer may greatly deviate from the communication frequency of the wireless card. Along with this, the wireless reader/writer may not normally receive a response from the wireless card. That is, the wireless reader/writer and wireless card which meet the standard of ISO or the like may not be able to communicate with each other.

BRIEF SUMMARY OF THE INVENTION

It is an object of the present invention to provide a wireless communication device and wireless communication method capable of solving a communication error caused by the antenna characteristic and realizing a normal communication environment.

A wireless communication device according to an aspect of the present invention comprises a main body antenna to communicate with an antenna of a wireless card, and antenna position setting means capable of setting a plurality of types of positional relationships between the antenna of the wireless card and the main body antenna.

A wireless communication method according to another aspect of the present invention comprises performing communication between an antenna of a wireless card and a main body antenna which are set to a predetermined positional relationship, changing the positional relationship between the antenna of the wireless card and the main body antenna, as needed, and performing communication between the antenna of the wireless card and the main body antenna.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an example of the schematic arrangement of a wireless communication device (wireless reader/writer) according to an embodiment of the present invention;

DETAILED DESCRIPTION OF THE INVENTION

A preferred embodiment of the present invention will be described below with reference to the several views of the accompanying drawing.

FIG. 1 is a block diagram showing an example of the schematic arrangement of a wireless communication device (to be referred to as a wireless reader/writer hereinafter) according to the embodiment of the present invention. A wireless reader/writer 1000 comprises a wireless reader/writer antenna (main body antenna) 100, control processor 1100, modulation circuit 1200, demodulation circuit 1300, wireless card conveyance/position adjustment unit 1400, and power supply circuit 1500.

The wireless reader/writer 1000 assumes communication in a communication environment at a distance of 20 mm or less between the antenna plane of the wireless reader/writer antenna 100 and that of a wireless card antenna 200. The control processor 1100 instructs the wireless card conveyance/position adjustment unit 1400 to convey a wireless card 2000 to a predetermined position. The wireless card conveyance/position adjustment unit 1400 conveys the wireless card 2000 in accordance with the instruction from the control processor 1100.

The control processor 1100 creates transmission data to the wireless card 2000. The modulation circuit 1200 modulates the transmission data, and converts it into a transmission signal. The transmission signal is transmitted from the wireless reader/writer antenna 100 to the wireless card 2000.

A response signal output from the wireless card antenna 200 of the wireless card 2000 is received by the wireless reader/writer antenna 100. The demodulation circuit 1300 demodulates the received response signal. The control processor 1100 processes the demodulated response signal, and instructs each unit on the next process.

The power supply circuit 1500 supplies power to each unit of the wireless reader/writer 1000.

The resonant frequency variation phenomenon in the wireless reader/writer antenna 100 of the wireless reader/writer 1000 and the antenna 200 of the wireless card 2000 will be explained with reference to FIGS. 2 to 4.

Figure 2:
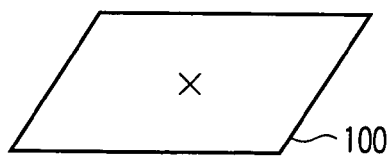
FIG. 2 is a view showing an example of a state in which no wireless card antenna exists near the wireless reader/writer antenna.
Figure 5:
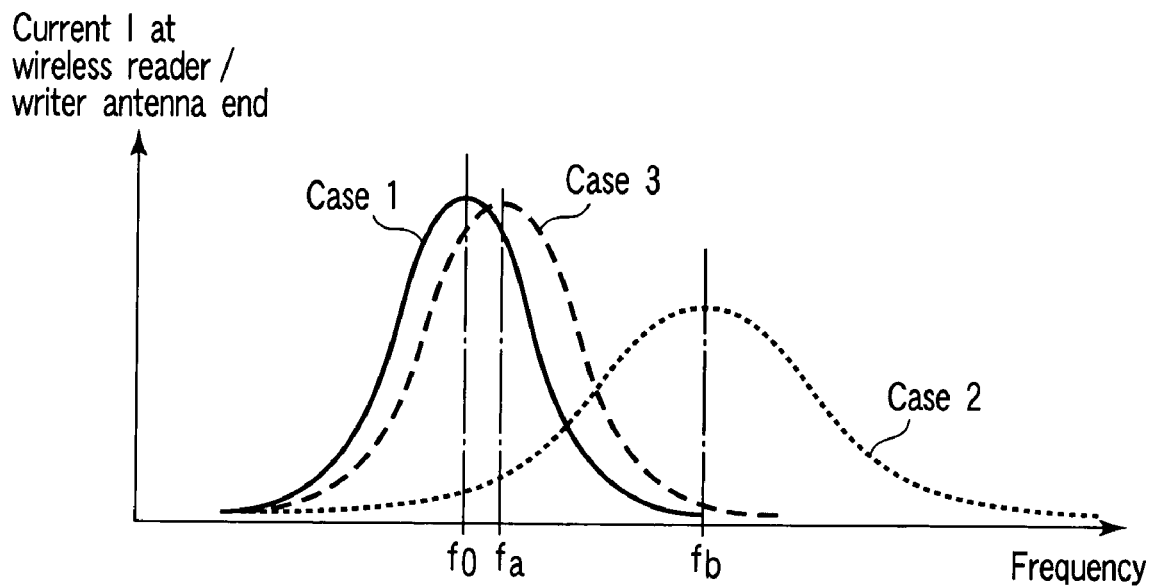
FIG. 5 is a graph showing an example of the frequency characteristic of the wireless reader/writer antenna in the states shown in FIGS. 2 to 4.

When the wireless card antenna 200 does not exist near the wireless reader/writer antenna 100, as shown in FIG. 2, the resonant frequency of the wireless reader/writer antenna 100 is $f_0$ around the communication frequency used to communicate with the wireless card 2000, as represented by the solid line (case 1) in FIG. 5.

Figure 3:
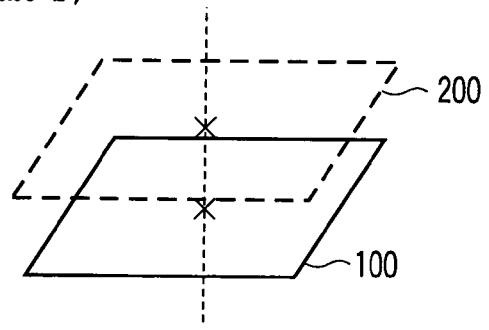
FIG. 3 is a view showing an example of a state in which predetermined conditions are met and cross coupling between the wireless reader/writer antenna and the wireless card antenna becomes strong and greatly influences their antenna characteristics.

When the following conditions (1) to (4) are met between the wireless reader/writer antenna 100 and the wireless card antenna 200, as shown in FIG. 3 (case 2), cross coupling between the antennas becomes strong and greatly influences their antenna characteristics.

(1) Arrangement in which the two antenna planes are parallel and close to each other.

(2) Arrangement in which the centers of the two antenna planes overlap each other or are close to each other.

(3) The shapes of the two antennas are similar.

(4) The sizes of the two antennas are almost equal.

Under these conditions, the antenna resonant frequency of the wireless reader/writer antenna 100 becomes $f_b$, and greatly deviates from $f_0$ around the communication frequency used to communicate with the wireless card 2000, as represented by the dotted line (case 2) in FIG. 5.

The wireless reader/writer 1000 and wireless card 2000 are formed with antenna shapes unique to their manufacturers. In some rare occasions, cross coupling between the antennas becomes strong, as described above. The antenna characteristic of the wireless reader/writer 1000 varies more than expected, and the resonant frequency changes to a frequency not suitable for communication with the wireless card 2000. In this case, the wireless reader/writer 1000 cannot receive any response from the wireless card 2000, failing in communication.

Figure 4:
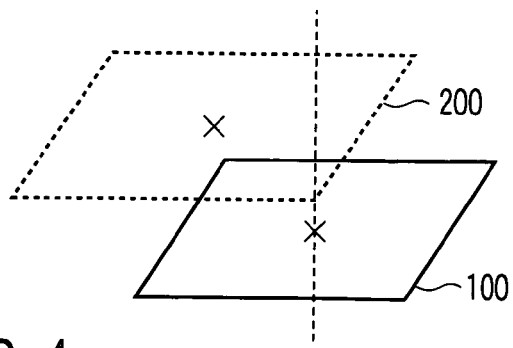
FIG. 4 is a view showing an example of a state in which the wireless card antenna exists near the wireless reader/writer antenna but does not greatly influence their antenna characteristics.

When the two antennas are shifted so that the centers of the antenna planes of the wireless card antenna 200 and wireless reader/writer antenna 100 do not overlap each other, as shown in FIG. 4 (case 3), cross coupling between the antennas reduces, and the resonant frequency of the wireless reader/writer antenna 100 changes to $f_a$ which is almost the same as one obtained when only the wireless reader/writer 1000 is arranged, as represented by the dotted line (case 3) in FIG. 5. As a result, the wireless reader/writer antenna 100 can receive a response from the wireless card 2000 and normally communicate with it.

However, the shift of the positions of the two antennas means an increase in the relative distance between them. Since the wireless card 2000 does not have any battery, its operating power depends on transmission radio waves from the wireless reader/writer 1000. That is, the wireless card 2000 receives transmission radio waves from the wireless reader/writer 1000, and converts them into power. Thus, if the relative distance between the wireless reader/writer 1000 and the wireless card 2000 becomes large, the wireless card 2000 may become short of operating power.

From this, the optimal positional relationship between the wireless reader/writer antenna 100 and the wireless card antenna 200 for normal communication between the wireless reader/writer 1000 and the wireless card 2000 changes depending on the shapes and LSI characteristics of various wireless card antennas 200.

The wireless communication device (wireless reader/writer 1000) and wireless communication method of the present invention implement normal communication with various types of wireless cards 2000 by properly adjusting the position of the wireless card antenna 200, as needed.

Adjustment of the antenna positional relationship in the parallel direction by the wireless communication device (wireless reader/writer 1000) and wireless communication method of the present invention will be explained.

Figure 6:
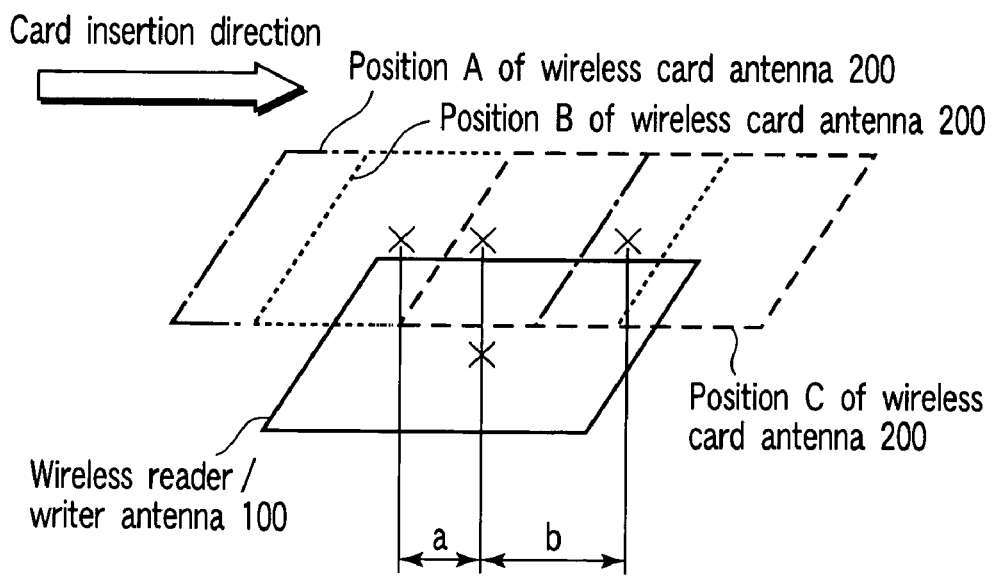
FIG. 6 is a view for explaining wireless card antenna position A, wireless card antenna position B, and wireless card antenna position C.

The wireless card conveyance/position adjustment unit 1400 of the wireless reader/writer 1000 can set a plurality of types of positional relationships between the wireless reader/writer antenna 100 and the wireless card antenna 200. For example, as shown in FIG. 6, the wireless card conveyance/position adjustment unit 1400 can receive the wireless card 2000 and convey the received wireless card 2000 to wireless card antenna position A, wireless card antenna position B, and wireless card antenna position C. In other words, the wireless card conveyance/position adjustment unit 1400 can change the positional relationship between the wireless reader/writer antenna 100 and the wireless card antenna 200, as needed. This can reduce the influence of cross coupling between the wireless reader/writer antenna 100 and the wireless card antenna 200 on their antenna characteristics. Consequently, one wireless reader/writer 1000 can appropriately communicate with various wireless cards 2000.

Details of wireless card antenna position A, wireless card antenna position B, and wireless card antenna position C are as follows.

As a premise, the antenna planes of the wireless reader/writer antenna 100 and wireless card antenna 200 are parallel to each other.

Wireless card antenna position B: at this position, the center (barycenter) of the antenna plane of the wireless card antenna 200 is located on the perpendicular to an antenna plane passing through the center (barycenter) of the antenna plane of the wireless reader/writer antenna 100.

Wireless card antenna position A: at this position, the wireless card 2000 slides parallel in a direction opposite to the card insertion direction from wireless card antenna position B. For example, as shown in FIG. 6, the wireless card 2000 slides by a distance a from wireless card antenna position B.

Wireless card antenna position C: at this position, the wireless card 2000 slides parallel in the card insertion direction from wireless card antenna position B. For example, as shown in FIG. 6, the wireless card 2000 slides by a distance c from wireless card antenna position B.

Figure 7:
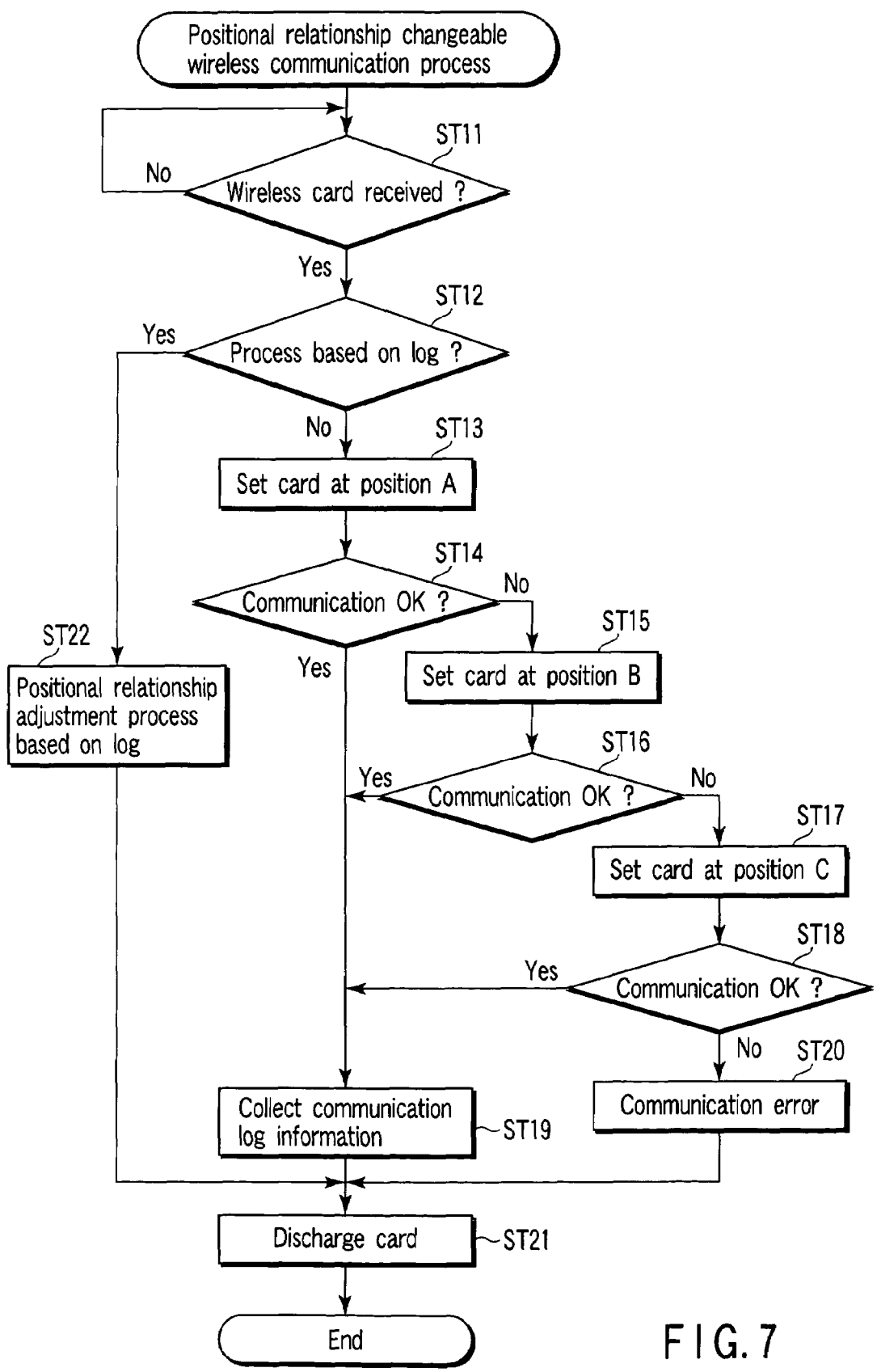
FIG. 7 is a flowchart showing an overall positional relationship change process.
Figure 8:
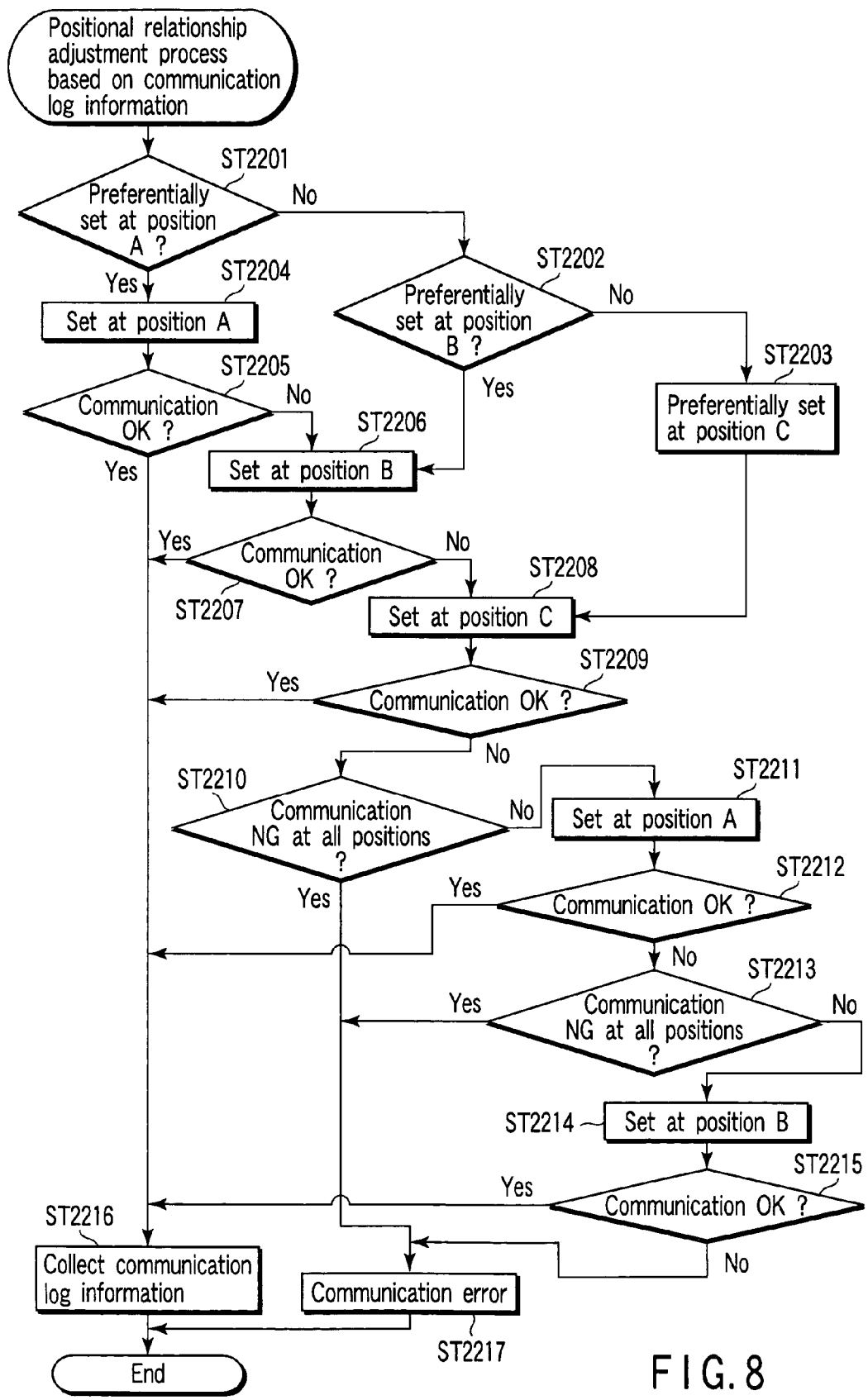
FIG. 8 is a flowchart showing a partial process in the positional relationship change process in FIG. 7, i.e., a positional relationship adjustment process based on communication log information.

A process of changing the positional relationship between the wireless reader/writer antenna 100 and the wireless card antenna 200 according to the embodiment of the present invention will be explained with reference to FIGS. 7 and 8. FIG. 7 is a flowchart showing the overall positional relationship change process. FIG. 8 is a flowchart showing a partial process in the positional relationship change process in FIG. 7.

A method of adjusting the positional relationship between the wireless reader/writer antenna 100 and the wireless card antenna 200 by adjusting the position of the wireless card 2000, i.e., that of the wireless card antenna 200 will be exemplified. However, the present invention is not limited to this. For example, the positional relationship may be adjusted by adjusting the position of the wireless reader/writer antenna 100. The positional relationship may also be adjusted by adjusting the positions of the wireless reader/writer antenna 100 and wireless card antenna 200.

As shown in FIG. 7, if the wireless card 2000 is inserted into the wireless reader/writer 1000, i.e., the wireless card conveyance/position adjustment unit 1400 receives the wireless card 2000 (YES in ST11), the positional relationship between the wireless reader/writer antenna 100 and the wireless card antenna 200 is adjusted, as needed. A case (YES in ST12) in which the flow does not advance to a positional relationship adjustment process based on communication log information will be explained first. The communication log information will be described later.

For example, the wireless card conveyance/position adjustment unit 1400 sets the wireless card 2000 at wireless card antenna position A (ST13). The wireless reader/writer antenna 100 transmits a transmission signal, and the control processor 1100 confirms whether the wireless reader/writer 1000 can normally communicate with the wireless card 2000 set at wireless card antenna position A (ST14). If the wireless reader/writer 1000 and the wireless card 2000 set at wireless card antenna position A can normally communicate with each other (YES in ST14), the control processor 1100 holds communication log information "communication is OK at wireless card antenna position A" (ST19). The wireless card conveyance/position adjustment unit 1400 discharges (returns) the received wireless card 2000 (ST21).

If the wireless reader/writer 1000 and the wireless card 2000 set at wireless card antenna position A cannot normally communicate with each other (NO in ST14), the wireless card conveyance/position adjustment unit 1400 sets the wireless card 2000 at wireless card antenna position B (ST15). The wireless reader/writer antenna 100 transmits a transmission signal, and the control processor 1100 confirms whether the wireless reader/writer 1000 can normally communicate with the wireless card 2000 set at wireless card antenna position B (ST16). If the wireless reader/writer 1000 and the wireless card 2000 set at wireless card antenna position B can normally communicate with each other (YES in ST16), the control processor 1100 holds communication log information "communication is OK at wireless card antenna position B" (ST19). The wireless card conveyance/position adjustment unit 1400 discharges (returns) the received wireless card 2000 (ST21).

If the wireless reader/writer 1000 and the wireless card 2000 set at wireless card antenna position B cannot normally communicate with each other (NO in ST16), the wireless card conveyance/position adjustment unit 1400 sets the wireless card 2000 at wireless card antenna position C (ST17). The wireless reader/writer antenna 100 transmits a transmission signal, and the control processor 1100 confirms whether the wireless reader/writer 1000 can normally communicate with the wireless card 2000 set at wireless card antenna position C (ST18). If the wireless reader/writer 1000 and the wireless card 2000 set at wireless card antenna position C can normally communicate with each other (YES in ST18), the control processor 1100 holds communication log information "communication is OK at wireless card antenna position C" (ST19). The wireless card conveyance/position adjustment unit 1400 discharges (returns) the received wireless card 2000 (ST21).

If the wireless reader/writer 1000 and the wireless card 2000 set at wireless card antenna position C cannot normally communicate with each other (NO in ST18), that is, if the wireless reader/writer 1000 and wireless card 2000 cannot normally communicate with each other even by setting the wireless card 2000 at wireless card antenna position A, wireless card antenna position B, or wireless card antenna position C, a communication error occurs (ST20), and the wireless card conveyance/position adjustment unit 1400 discharges (returns) the received wireless card 2000 (ST21).

As described above, even when the wireless reader/writer 1000 and wireless card 2000 cannot normally communicate with each other at a specific wireless card antenna position, a communication error by the antenna characteristic can be solved by position adjustment to implement normal communication.

The positional relationship adjustment process based on communication log information will be explained with reference to the flowchart shown in FIG. 8. When the wireless reader/writer 1000 and wireless card 2000 normally communicate with each other in previous communication, as shown in FIG. 7, their positional relationship and communication result are held as communication log information in ST19. In subsequent communication, the communication log information is utilized to efficiently select and set the wireless card antenna position. If the wireless reader/writer 1000 and wireless card 2000 normally communicate with each other at least once in previous communication, subsequent communication can use the communication log information (YES in ST12). That is, the positional relationship adjustment process based on the communication log information can be executed (ST22).

For example, if the communication log information represents that the position at which previous communication can be normally achieved is wireless card antenna position A (YES in ST2201), the wireless card conveyance/position adjustment unit 1400 preferentially (first) sets the wireless card 2000 at wireless card antenna position A on the basis of the communication log information (ST2204). The wireless reader/writer antenna 100 transmits a transmission signal, and the control processor 1100 confirms whether the wireless reader/writer 1000 can normally communicate with the wireless card 2000 set at wireless card antenna position A (ST2205). If the wireless reader/writer 1000 and the wireless card 2000 set at wireless card antenna position A can normally communicate with each other (YES in ST2205), the control processor 1100 updates the communication log information (ST2216). That is, the control processor 1100 holds communication log information "communication is OK at wireless card antenna position A". The wireless reader/writer 1000 often uses a wireless card 2000 manufactured by the same manufacturer as that of the wireless reader/writer 1000. Normal communication can be efficiently implemented in the next communication by preferentially setting the position represented by the communication log information at which previous communication can be normally established.

If the wireless reader/writer 1000 and the wireless card 2000 set at wireless card antenna position A cannot normally communicate with each other (NO in ST2205), the wireless card conveyance/position adjustment unit 1400 sets the wireless card 2000 at wireless card antenna position B (ST2206). The wireless reader/writer antenna 100 transmits a transmission signal, and the control processor 1100 confirms whether the wireless reader/writer 1000 can normally communicate with the wireless card 2000 set at wireless card antenna position B (ST2207). If the wireless reader/writer 1000 and the wireless card 2000 set at wireless card antenna position B can normally communicate with each other (YES in ST2207), the control processor 1100 updates the communication log information (ST2216). That is, the control processor 1100 holds communication log information "communication is OK at wireless card antenna position B".

If the wireless reader/writer 1000 and the wireless card 2000 set at wireless card antenna position B cannot normally communicate with each other (NO in ST2207), the wireless card conveyance/position adjustment unit 1400 sets the wireless card 2000 at wireless card antenna position C (ST2208). The wireless reader/writer antenna 100 transmits a transmission signal, and the control processor 1100 confirms whether the wireless reader/writer 1000 can normally communicate with the wireless card 2000 set at wireless card antenna position C (ST2209). If the wireless reader/writer 1000 and the wireless card 2000 set at wireless card antenna position C can normally communicate with each other (YES in ST2209), the control processor 1100 updates the communication log information (ST2216). That is, the control processor 1100 holds communication log information "communication is OK at wireless card antenna position C".

If the wireless reader/writer 1000 and the wireless card 2000 set at wireless card antenna position C cannot normally communicate with each other (NO in ST2209), that is, if the wireless reader/writer 1000 and wireless card 2000 cannot normally communicate with each other even by setting the wireless card 2000 at wireless card antenna position A, wireless card antenna position B, or wireless card antenna position C (YES in ST2210), a communication error occurs (ST2217).

If the communication log information represents that the position at which previous communication can be normally achieved is wireless card antenna position B (YES in ST2202), the wireless card conveyance/position adjustment unit 1400 preferentially (first) sets the wireless card 2000 at wireless card antenna position B on the basis of the communication log information (ST2206). The wireless reader/writer antenna 100 transmits a transmission signal, and the control processor 1100 confirms whether the wireless reader/writer 1000 can normally communicate with the wireless card 2000 set at wireless card antenna position B (ST2207). If the wireless reader/writer 1000 and the wireless card 2000 set at wireless card antenna position B can normally communicate with each other (YES in ST2207), the control processor 1100 updates the communication log information (ST2216). That is, the control processor 1100 holds communication log information "communication is OK at wireless card antenna position B".

If the wireless reader/writer 1000 and the wireless card 2000 set at wireless card antenna position B cannot normally communicate with each other (NO in ST2207), the wireless card conveyance/position adjustment unit 1400 sets the wireless card 2000 at wireless card antenna position C (ST2208). The wireless reader/writer antenna 100 transmits a transmission signal, and the control processor 1100 confirms whether the wireless reader/writer 1000 can normally communicate with the wireless card 2000 set at wireless card antenna position C (ST2209). If the wireless reader/writer 1000 and the wireless card 2000 set at wireless card antenna position C can normally communicate with each other (YES in ST2209), the control processor 1100 updates the communication log information (ST2216). That is, the control processor 1100 holds communication log information "communication is OK at wireless card antenna position C".

Even if the wireless reader/writer 1000 and the wireless card 2000 set at wireless card antenna position C cannot normally communicate with each other (NO in ST2207), a communication error has not been confirmed at all wireless card antenna positions (NO in ST2210). Thus, the wireless card conveyance/position adjustment unit 1400 sets the wireless card 2000 at wireless card antenna position A (ST2211). The wireless reader/writer antenna 100 transmits a transmission signal, and the control processor 1100 confirms whether the wireless reader/writer 1000 can normally communicate with the wireless card 2000 set at wireless card antenna position A (ST2212). If the wireless reader/writer 1000 and the wireless card 2000 set at wireless card antenna position A can normally communicate with each other (YES in ST2212), the control processor 1100 updates the communication log information (ST2216). That is, the control processor 1100 holds communication log information "communication is OK at wireless card antenna position A".

If the wireless reader/writer 1000 and the wireless card 2000 set at wireless card antenna position A cannot normally communicate with each other (NO in ST2212), that is, if the wireless reader/writer 1000 and wireless card 2000 cannot normally communicate with each other even by setting the wireless card 2000 at wireless card antenna position B, wireless card antenna position C, or wireless card antenna position A (YES in ST2213), a communication error occurs (ST2217).

If the communication log information represents that the position at which previous communication can be normally achieved is wireless card antenna position C (YES in ST2203), the wireless card conveyance/position adjustment unit 1400 preferentially (first) sets the wireless card 2000 at wireless card antenna position C on the basis of the communication log information (ST2208). The wireless reader/writer antenna 100 transmits a transmission signal, and the control processor 1100 confirms whether the wireless reader/writer 1000 can normally communicate with the wireless card 2000 set at wireless card antenna position C (ST2209). If the wireless reader/writer 1000 and the wireless card 2000 set at wireless card antenna position C can normally communicate with each other (YES in ST2209), the control processor 1100 updates the communication log information (ST2216). That is, the control processor 1100 holds communication log information "communication is OK at wireless card antenna position C".

Even if the wireless reader/writer 1000 and the wireless card 2000 set at wireless card antenna position C cannot normally communicate with each other (NO in ST2209), a communication error has not been confirmed at all wireless card antenna positions (NO in ST2210). Thus, the wireless card conveyance/position adjustment unit 1400 sets the wireless card 2000 at wireless card antenna position A (ST2211). The wireless reader/writer antenna 100 transmits a transmission signal, and the control processor 1100 confirms whether the wireless reader/writer 1000 can normally communicate with the wireless card 2000 set at wireless card antenna position A (ST2212). If the wireless reader/writer 1000 and the wireless card 2000 set at wireless card antenna position A can normally communicate with each other (YES in ST2212), the control processor 1100 updates the communication log information (ST2216). That is, the control processor 1100 holds communication log information "communication is OK at wireless card antenna position A".

Even if the wireless reader/writer 1000 and the wireless card 2000 set at wireless card antenna position A cannot normally communicate with each other (NO in ST2212), a communication error has not been confirmed at all wireless card antenna positions (NO in ST2213). Thus, the wireless card conveyance/position adjustment unit 1400 sets the wireless card 2000 at wireless card antenna position B (ST2214). The wireless reader/writer antenna 100 transmits a transmission signal, and the control processor 1100 confirms whether the wireless reader/writer 1000 can normally communicate with the wireless card 2000 set at wireless card antenna position B (ST2215). If the wireless reader/writer 1000 and the wireless card 2000 set at wireless card antenna position B can normally communicate with each other (YES in ST2215), the control processor 1100 updates the communication log information (ST2216). That is, the control processor 1100 holds communication log information "communication is OK at wireless card antenna position B".

If the wireless reader/writer 1000 and the wireless card 2000 set at wireless card antenna position B cannot normally communicate with each other (NO in ST2215), that is, if the wireless reader/writer 1000 and wireless card 2000 cannot normally communicate with each other even by setting the wireless card 2000 at wireless card antenna position C, wireless card antenna position A, or wireless card antenna position B (YES in ST2215), a communication error occurs (ST2217).

Adjustment of the antenna positional relationship in the vertical direction by the wireless communication device (wireless reader/writer 1000) and wireless communication method of the present invention will be explained. Adjustment in the parallel direction has been described, and adjustment in the vertical direction (to be described below) can also be applied to the present invention.

Figure 9:
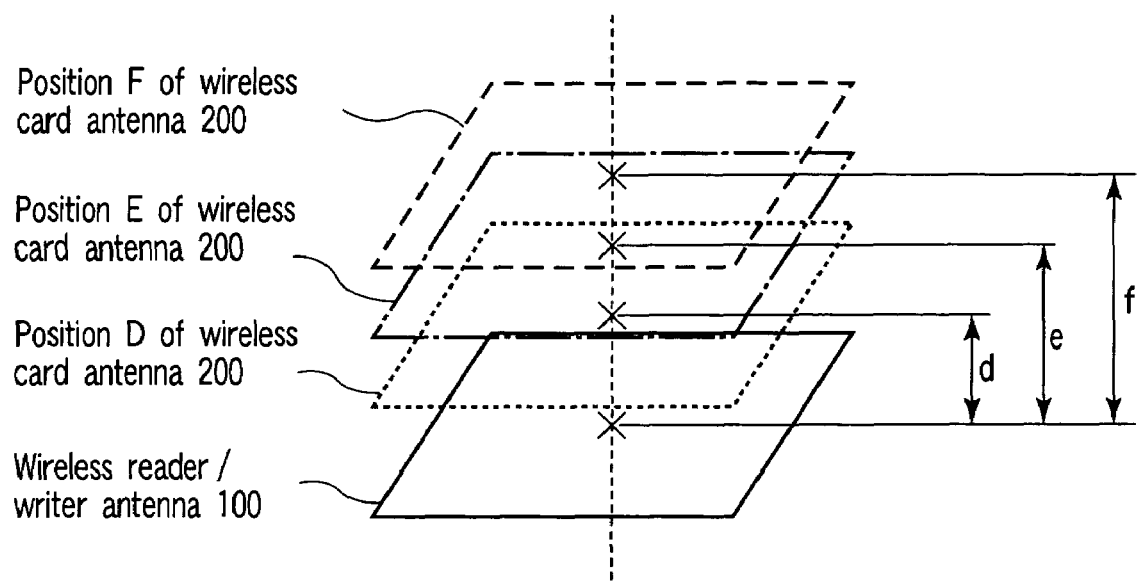
FIG. 9 is a view for explaining wireless card antenna position D, wireless card antenna position E, and wireless card antenna position F.

For example, as shown in FIG. 9, the wireless card conveyance/position adjustment unit 1400 can receive the wireless card 2000 and convey the received wireless card 2000 to wireless card antenna position D, wireless card antenna position E, and wireless card antenna position F. In other words, the wireless card conveyance/position adjustment unit 1400 can change the positional relationship between the wireless reader/writer antenna 100 and the wireless card antenna 200, as needed. This can reduce the influence of cross coupling between the wireless reader/writer antenna 100 and the wireless card antenna 200 on their antenna characteristics. As a result, one wireless reader/writer 1000 can appropriately communicate with various wireless cards 2000.

Details of wireless card antenna position D, wireless card antenna position E, and wireless card antenna position F are as follows.

As a premise, the antenna planes of the wireless reader/writer antenna 100 and wireless card antenna 200 are parallel to each other.

Wireless card antenna position E: at this position, the center (barycenter) of the antenna plane of the wireless card antenna 200 is located on the perpendicular to an antenna plane passing through the center (barycenter) of the antenna plane of the wireless reader/writer antenna 100. The distance between the centers of the two antenna planes is a distance e.

Wireless card antenna position D: at this position, the center (barycenter) of the antenna plane of the wireless card antenna 200 is located on the perpendicular to an antenna plane passing through the center (barycenter) of the antenna plane of the wireless reader/writer antenna 100. The distance between the centers of the two antenna planes is a distance d (distance d<distance e).

Wireless card antenna position F: at this position, the center (barycenter) of the antenna plane of the wireless card antenna 200 is located on the perpendicular to an antenna plane passing through the center (barycenter) of the antenna plane of the wireless reader/writer antenna 100. The distance between the centers of the two antenna planes is a distance f (distance f>distance e).

When d<e<f, the wireless reader/writer antenna 100 may be greatly influenced by the antenna characteristic from the wireless card antenna 200 in the order of d>e>f.

The present invention can adopt a combination of the above-mentioned adjustment in the parallel direction and adjustment in the vertical direction. Also in this case, the influence of cross coupling between the wireless reader/writer antenna 100 and the wireless card antenna 200 on their antenna characteristics can be reduced. One wireless reader/writer 1000 can properly communicate with various wireless cards 2000.

In the above description, the positional relationship between the wireless reader/writer antenna 100 and the wireless card antenna 200 is changed by changing the position of the wireless card 2000, i.e., that of the wireless card antenna 200. However, the present invention is not limited to this. For example, the position of the wireless card 2000 may be fixed, and only that of the wireless reader/writer antenna 100 may be changed. Alternatively, the positions of both the wireless card 2000 and wireless reader/writer antenna 100 may be changed.

As has been described above, the wireless communication device (wireless reader/writer 1000) and wireless communication method of the present invention can set a plurality of types of antenna positional relationships. The probability of communication errors can be decreased for various types of wireless cards, and the wireless communication device can appropriately communicate with various types of wireless cards. By utilizing communication log information, the process time can be shortened in an environment where many identical wireless cards are available.

The present invention can provide a wireless communication device and wireless communication method capable of solving a communication error caused by the antenna characteristic and realizing a normal communication environment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication device comprising:
a main body antenna to communicate with an antenna of a first wireless card;
antenna position setting means capable of setting a plurality of types of positional relationships between the antenna of the first wireless card and the main body antenna;

communication means for performing communication between the antenna of the first wireless card and the main body antenna which are set to a predetermined positional relationship based upon the normal position relationship between the antenna of the first wireless card and the main body extension by the antenna position setting means; and positional relationship control means for controlling setting of the positional relationship between the antenna of the first wireless card and the main body antenna by the antenna position setting means subsequent to a setting based upon the normal position relationship between the antenna of the first wireless card and the main body extension, and as needed on the basis of a communication state by the communication means;

wherein the positional relationship control means stores the normal position relationship between the antenna of the first wireless card and the main body antenna as communication log information, and when communication is implemented normally in a first communication process, initially sets the antenna of a second wireless card and the main body antenna to the normal position relationship, on the basis of the communication log information, in a second communication process subsequent to the first communication process.

2. A device according to claim 1, wherein while maintaining a plane of the antenna of the first wireless card and a plane of the main body antenna parallel to each other, the antenna position setting means can set the plurality of types of the positional relationships between the antenna of the first wireless card and the main body antenna.

3. A device according to claim 1, wherein while maintaining a plane of the antenna of the first wireless card and a plane of the main body antenna parallel to each other, the antenna position setting means can set the plurality of types of the positional relationships between the antenna of the first wireless card and the main body antenna in a direction parallel to the plane of the antenna of the first wireless card and the plane of the main body antenna.

4. A device according to claim 1, wherein while maintaining a plane of the antenna of the first wireless card and a plane of the main body antenna parallel to each other, the antenna position setting means can set the plurality of types of the positional relationships between the antenna of the first wireless card and the main body antenna in a direction perpendicular to the plane of the antenna of the first wireless card and the plane of the main body antenna.

5. A wireless communication method comprising:

performing communication between an antenna of a first wireless card and a main body antenna which are set to a predetermined positional relationship based upon the normal position relationship between the antenna of the first wireless card and the main body extension;

changing the positional relationship between the antenna of the first wireless card and the main body antenna subsequent to a setting based upon the normal position relationship between the antenna of the first wireless card and the main body extension, and, as needed on the basis of a communication state between the antenna of the first wireless card and the main body antenna which are set to the predetermined positional relationship; and performing communication between the antenna of the first wireless card and the main body antenna which are set to the changed positional relationship;

wherein the normal position relationship between the antenna of the first wireless card and the main body antenna, and when communication is implemented normally is stored as communication log information in a first communication process, the antenna of a second wireless card and the main body antenna is initially set to the normal position relationship on the basis of the communication log information, in a second communication process subsequent to the first communication process.

6. A method according to claim 5, wherein while a plane of the antenna of the first wireless card and a plane of the main body antenna are maintained parallel to each other, the positional relationship between the antenna of the first wireless card and the main body antenna is changed.

7. A method according to claim 5, wherein while a plane of the antenna of the first wireless card and a plane of the main body antenna are maintained parallel to each other, the positional relationship between the antenna of the first wireless card and the main body antenna is changed in a direction parallel to the plane of the antenna of the first wireless card and the plane of the main body antenna.

8. A method according to claim 5, wherein while a plane of the antenna of the first wireless card and a plane of the main body antenna are maintained parallel to each other, the positional relationship between the antenna of the first wireless card and the main body antenna is changed in a direction perpendicular to the plane of the antenna of the first wireless card and the plane of the main body antenna.

* * * * *